United States Patent
Ito et al.

(10) Patent No.: US 6,796,400 B2
(45) Date of Patent: Sep. 28, 2004

(54) ELECTRIC POWER STEERING MECHANISM CONTROL METHOD AND ELECTRIC POWER STEERING MECHANISM

(75) Inventors: Akira Ito, Aichi-Pref. (JP); Atsuo Sakai, Aichi-Pref. (JP)

(73) Assignee: Toyoda Machine Works, Ltd., Aichi-Pref. (JP)

( * ) Notice: Subject to any disclaimer, the term of this patent is extended or adjusted under 35 U.S.C. 154(b) by 125 days.

(21) Appl. No.: 10/235,709

(22) Filed: Sep. 6, 2002

(65) Prior Publication Data

US 2003/0057011 A1 Mar. 27, 2003

(30) Foreign Application Priority Data

Sep. 7, 2001 (JP) ........................................ 2001-271669

(51) Int. Cl.⁷ .................................................. B62D 5/04
(52) U.S. Cl. ........................................ 180/446; 180/443
(58) Field of Search ................................ 180/446, 443, 180/404; 701/41, 43; 318/434, 445, 430

(56) References Cited

U.S. PATENT DOCUMENTS

| | | | |
|---|---|---|---|
| 4,727,950 A | * | 3/1988 | Shimizu et al. ............ 180/446 |
| 4,895,216 A | * | 1/1990 | Fusimi et al. .............. 180/446 |
| 5,082,076 A | * | 1/1992 | Oshita et al. ............... 180/404 |
| 5,283,741 A | | 2/1994 | Desrus |
| 5,303,156 A | * | 4/1994 | Matsuoka et al. ........... 701/43 |
| 5,485,067 A | * | 1/1996 | Nishimoto et al. .......... 318/466 |
| 5,602,735 A | * | 2/1997 | Wada .......................... 701/41 |
| 5,659,472 A | * | 8/1997 | Nishino et al. ............... 701/41 |
| 6,268,708 B1 | | 7/2001 | Kawada et al. |
| 2002/0166716 A1 | * | 11/2002 | Shimizu et al. ............ 180/446 |

FOREIGN PATENT DOCUMENTS

| | | |
|---|---|---|
| EP | 0 341 833 | 11/1989 |
| WO | WO 01/20412 | 3/2001 |

* cited by examiner

*Primary Examiner*—Lesley D. Morris
*Assistant Examiner*—Daniel Yeagley
(74) *Attorney, Agent, or Firm*—Oblon, Spivak, McClelland, Maier & Neustadt, P.C.

(57) ABSTRACT

The electric power steering mechanism restricts a drive power supplied to a motor to less than a predetermined value if it detects a period of more than 200 mS in which the condition (1) that there is no change in the rotation angle of the rotation angle sensor and the condition (2) that the steering torque is over 7 Nm are satisfied at the same time. Consequently, torque generated by the motor is reduced, so that if end contact state is present, a rack shaft is returned in an opposite direction to the rack end by a reaction of a tire and as a result, a steering shaft is rotated, thereby the motor and the rotation angle sensor being rotated. That is, it is detected that the end contact state is present if there is a change in the rotation angle (Yes in (4) due to decrease in the drive power and that the motor remains stopped due to other reason if there is no change in the rotation angle (No in (4)).

4 Claims, 5 Drawing Sheets

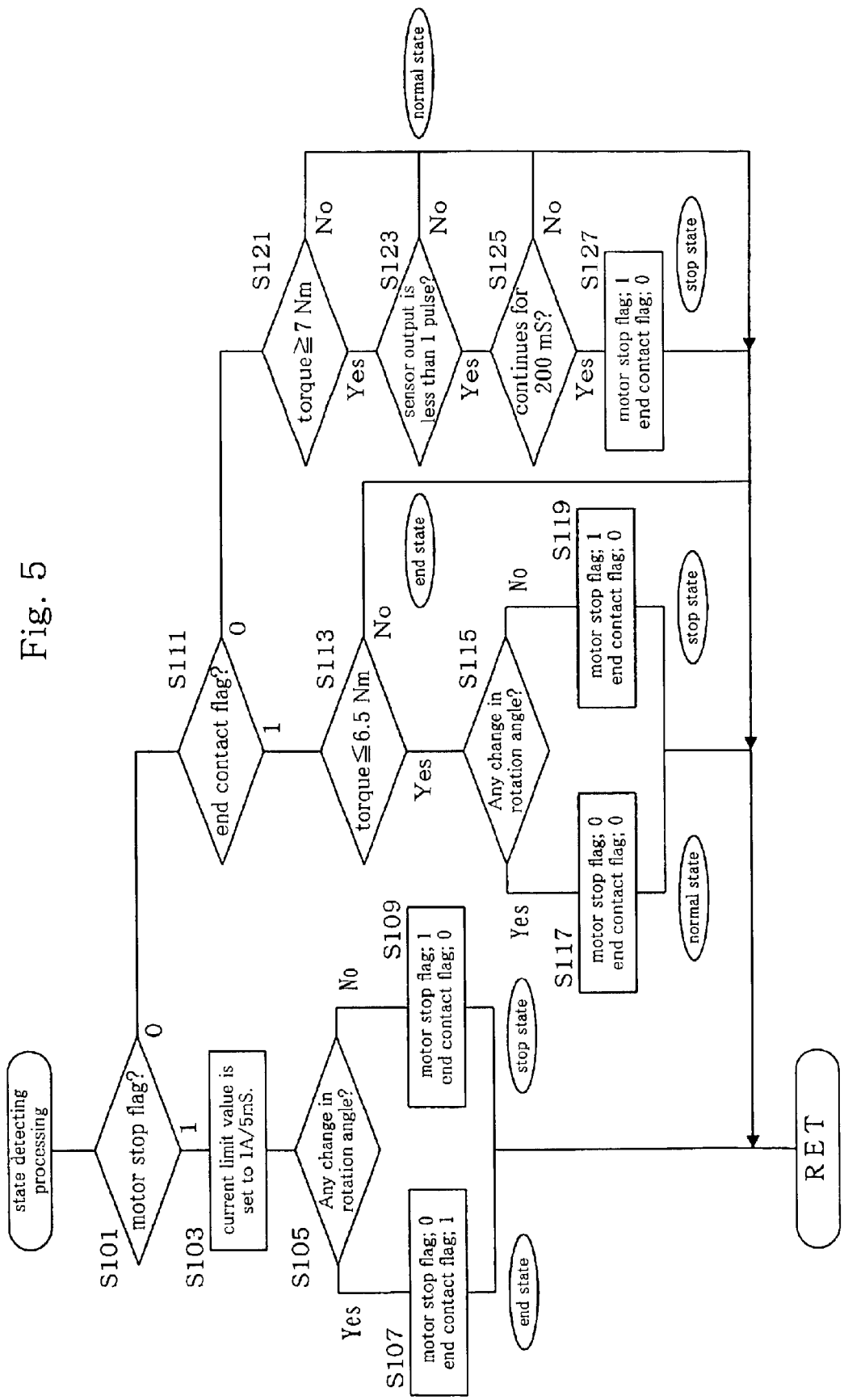

ELECTRIC POWER STEERING MECHANISM CONTROL METHOD AND ELECTRIC POWER STEERING MECHANISM

BACKGROUND OF THE INVENTION

1. Field of the Invention

The present invention relates to a control method for an electric power steering mechanism having a motor for assisting a steering force based on a steering torque generated in a steering shaft and an electric power steering mechanism.

2. Description of the Related Art

The electric power steering mechanism includes a motor for assisting a steering force based on a steering torque generated in the steering shaft and a driving current, obtained by proportional-integrating deviations between a current instruction value determined based on a steering torque, vehicle velocity, rotation angle of this motor and the like and a current detection value flowing actually through that motor, is supplied to this motor. Therefore, if the rotation angle information of the motor obtained from a rotation angle sensor is not normal, a current instruction value determined thereon is not appropriate.

Thus, conventionally, as art for detecting a trouble in the rotation angle sensor which detects the rotation angle of a motor in an electric power steering mechanism and outputs its relative value, for example, an incremental encoder, a method in which an absolute encoder is employed simultaneously and the output pattern (absolute value information) of the absolute encoder is compared with the output pulses (relative value information) of phase A and phase B of an incremental encoder so as to detect a trouble in the incremental encoder, has been well known.

However, because the incremental encoder outputs pulse strings of phase A and phase B with changes in the rotation angle as relative values, when a motor which is a detection object about the rotation angle, is not rotating, no pulse string is outputted from the incremental encoder as a rule, different from the absolute encoder which outputs an absolute value of the rotation angle (about a pulse may be outputted depending on the circuit configuration).

Thus, the configuration for detecting a trouble in the rotation angle sensor (incremental encoder) by using the absolute encoder simultaneously is not capable of detecting the trouble in the rotation angle sensor until the motor, which is a detecting object, is rotated to some extent.

Therefore, if the motor for assisting a steering force of the electric power steering mechanism is not rotated due to some reason, system for detecting a trouble in the rotation angle sensor by using the absolute encoder at the same time cannot detect the trouble in the rotation angle sensor of that motor.

As an example that the motor for assisting the steering force of the electric power steering mechanism is not rotated for some reason, there is a case where the steering wheel is turned ultimately so that a pinion gear of a rack & pinion which construct a steering gear box reaches a rack end (hereinafter referred to as end contact state).

In such an end contact state, even if the pinion rides over the rack, the steering shaft is never rotated further in the same direction. Particularly, if the end contact state is generated by stationary steering, a drive current for generating a torque which blocks a steering wheel turned ultimately from being returned in an opposite direction by a reaction force of a tire is supplied to the motor and controlled so that the reaction force of the tire balances with the steering force. Thus, in the end contact state, it is not necessary to supply so much sufficient drive current to the motor.

However, when the motor is not rotated, the conventional art is incapable of determining which the phenomenon is originated from a trouble in the rotation angle sensor or the end contact state. In such an end contact state, a so sufficient drive current is supplied to the motor thereby leading to generation of heat in the motor.

If the motor is provided with the function for if the temperature of the motor is raised over a predetermined temperature, suppressing the drive current of the motor so as to prevent generation of heat as a function for protecting the motor from the generation of heat, providing a driver's driving sense with feeling of inconvenience therefore is not preferable.

SUMMARY OF THE INVENTION

The present invention has been achieved to solve the above-described problem and therefore an object of the invention is to provide a control method for an electric power steering mechanism capable of detecting an end contact state even if a motor is not rotated and an electric power steering mechanism. Another object of the present invention is to provide a control method for the electric power steering mechanism capable of preventing generation of heat in the end contact state and an electric power steering mechanism.

Still another object of the present invention is to provide a control method for the electric power steering mechanism capable of improving a steering sense when the motor is not rotated and an electric power steering mechanism.

In order to achieve the above objects, a control method for electric power steering mechanism having a motor for assisting a steering force based on a steering torque generated in a steering shaft according to the present invention is characterized in that if it is detected that the condition that the sensor output of a rotation angle sensor which detects a rotation angle of said motor and outputs its relative value is substantially zero and the condition that said steering torque is over a predetermined value are satisfied at the same time, the drive power supplied to said motor is restricted to less than a predetermined value.

A control method for electric power steering mechanism in accordance with the more preferred teaching of the present invention is characterized in that with said drive power restricted to less than the predetermined value, it is determined that if there is a sensor output of said rotation angle sensor, end contact state is present and if there is no sensor output of said rotation angle sensor, motor stop state originated from a trouble in said rotation angle sensor is present.

According to the control method for the electric power steering mechanism of a first aspect and a second aspect of the present invention, if it is detected that the condition that the sensor output of the rotation angle sensor is substantially zero and the condition that the steering torque is over a predetermined value are satisfied at the same time, the drive power supplied to the motor is restricted to less than a predetermined value. If it is detected that both the conditions are satisfied at the same time or the rotation of the motor is stopped, torque generated by the motor is reduced. Thus, the rack shaft is returned in an opposite direction to the rack end by a reaction of a tire if the end contact state is present, so that the pinion gear on that rack is rotated. As a result, the steering shaft coupled with the pinion gear is rotated, so that the motor and the rotation angle sensor can be rotated. Thus, if the end contact state is present, the sensor output can be produced. Therefore, there is such an effect that even if the motor is not rotated, the end contact state can be detected by detecting the sensor output.

Further, because the drive power supplied to the motor is restricted to less than a predetermined value, the drive power supplied more than necessary can be reduced if the end contact state is present. Thus, there is such an effect that generation of heat from the motor under the end contact state is prevented.

Further, because the drive power supplied to the motor is restricted to less than a predetermined value, torque generated by the motor can be reduced if the rotation of the motor is stopped due to a trouble in the rotation angle sensor. Thus, there is such an effect that steering feeling is improved.

An electric power steering mechanism having a motor for assisting a steering force based on a steering torque generated in a steering shaft according to the present invention is characterized by comprising:

a sensor output detecting means for detecting the sensor output of a rotation angle sensor which detects the rotation angle of said motor and outputs its relative value;

a steering torque detecting means for detecting a steering torque generated in said steering shaft;

a state detecting means for detecting such a predetermined state that said sensor output detected by said sensor output detecting means is substantially zero while said steering torque detected by said steering torque detecting means is over a predetermined value; and a drive power restricting means for if said predetermined state is detected by said state detecting means, restricting the drive power supplied to said motor to less than a predetermined value.

An electric power steering mechanism in accordance with the more preferred teaching of the present invention is characterized by further comprising a state determining means for, with the drive power restricted to less than the predetermined value by said drive force transmitting means, determining that if there is a sensor output of said rotation angle sensor, end contact state is present and if there is no sensor output of said rotation angle sensor, motor stop state originated from a trouble in said rotation angle sensor is present.

In the electric power steering mechanism according to a third aspect and a fourth aspect of the present invention, the sensor output of the rotation angle sensor which detects the rotation angle of a motor and outputs its relative value is detected by the sensor output detecting means and a steering torque generated in a steering shaft is detected by a steering torque detecting means. Then, if a state detecting means detects such a predetermined state that the sensor output detected by the sensor output detecting means is substantially zero and that the steering torque detected by the steering torque detecting means is over a predetermined value, a drive power restricting means restricts the drive power supplied to the motor to less than a predetermined value. Consequently, because the drive power supplied to the motor is restricted to less than a predetermined value, the rack shaft is returned in an opposite direction to the rack end by reaction of a tire, so that the pinion gear on that rack is rotated. As a result, the steering shaft coupled with the pinion gear is rotated, so that the motor and the rotation angle sensor can be rotated. Thus, if the end contact state is present, the sensor output can be produced. Therefore, there is such an effect that even if the motor is not rotated, the end contact state can be detected by detecting the sensor output.

Further, because the drive power supplied to the motor is restricted to less than a predetermined value, the drive power supplied more than necessary can be reduced if the end contact state is present. Thus, there is such an effect that generation of heat from the motor under the end contact state is prevented.

Further, because the drive power supplied to the motor is restricted to less than a predetermined value, torque generated by the motor can be reduced if the rotation of the motor is stopped due to a trouble in the rotation angle sensor. Thus, there is such an effect that steering feeling is improved.

BRIEF DESCRIPTION OF THE DRAWINGS

FIG. 5 is a flow chart showing the state detecting processing by the electric power steering mechanism of this embodiment.

DESCRIPTION OF THE PREFERRED EMBODIMENTS

Hereinafter, the preferred embodiments of the present invention will be described with reference to the accompanying drawings.

First, the main hardware configuration of an electric power steering mechanism 10, which is an embodiment of the electric power steering mechanism of the present invention, will be described with reference to FIG. 2. The electric power steering mechanism 10 provided on a vehicle such as automobile will be exemplified.

Figure 2:
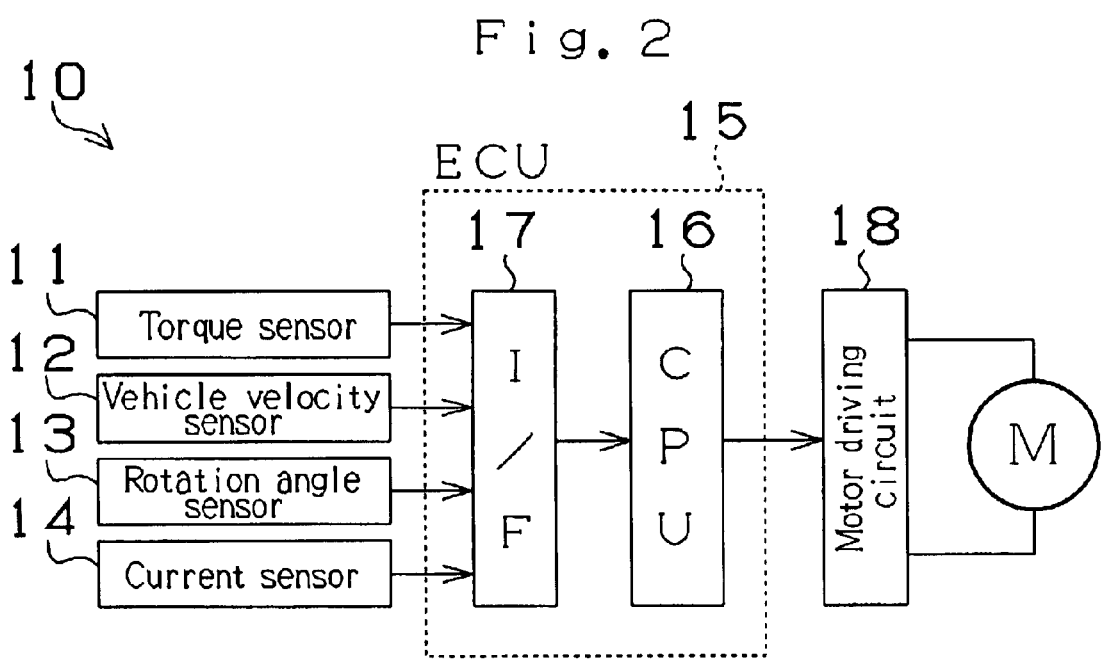
FIG. 2 is a block diagram showing the main hardware configuration of the electric power steering mechanism of this embodiment.

As shown in FIG. 2, the electric power steering mechanism 10 comprises mainly various kinds of sensors such as a torque sensor 11, a vehicle velocity sensor 12, a rotation angle sensor 13, a current sensor 14, an ECU 15, a motor driving circuit 18 and a motor M.

The torque sensor 11 detects a steering torque from the amount of torsion of a torsion bar or the like for coupling the input shaft connected to the steering wheel of a vehicle with the output shaft connected to steering mechanism such that they are rotatable relative to each other. The steering torque detected by this torque sensor 11 is inputted to the ECU 15 with a vehicle velocity detected by the vehicle velocity sensor 12. The rotation angle of the motor M (for example, brushless DC motor) for assisting a steering force of steering operation is detected by the rotation angle sensor 13 and current values iu, iv flowing through the phases u, v of the motor are detected by the current sensor 14 and inputted to the ECU 15.

Meanwhile this rotation angle sensor 13 is a rotation angle sensor which detects the rotation angle of the motor M and outputs its relative value, for example, an incremental encoder, which outputs pulse strings of phases A, B with changes in the rotation angle as relative values.

The CPU 16, which constructs the ECU 15, determines current instruction values id*, iq* to be transmitted to the motor driving circuit 18, which will be described later, based on the steering torque, vehicle velocity, rotation angle of the motor and revolution number inputted through an interface 17 and computes voltage instruction values vu*, vv*, vw* to be outputted to the motor driving circuit 18 through predetermined proportional integration control or the like.

On the other hand, the motor driving circuit 18 outputs driving voltages corresponding to the voltage instruction values vu*, vv*, vw* transmitted from the CPU 16 to the motor M and detects driving currents (phases u, v) flowing to the motor M with a current sensor 14, and then inputs the current detection values iu, iv to the ECU 15 as feedback values. Consequently, the motor M generates an assist torque for assisting a steering force by the steering wheel or generates a torque for restoring the steering wheel.

Next, a control method for the motor M by d/q conversion will be described with a block diagram of main functions of the electric power steering mechanism 10 shown in FIG. 3. The d/q conversion refers to a method of computing AC current as DC current by setting up an orthogonal coordinates with the same direction as magnetic flux of the rotator of the motor as axis d and a direction perpendicular to this axis d as axis q and copying the vector of AC current flowing through each phase to that orthogonal coordinates.

Figure 3:
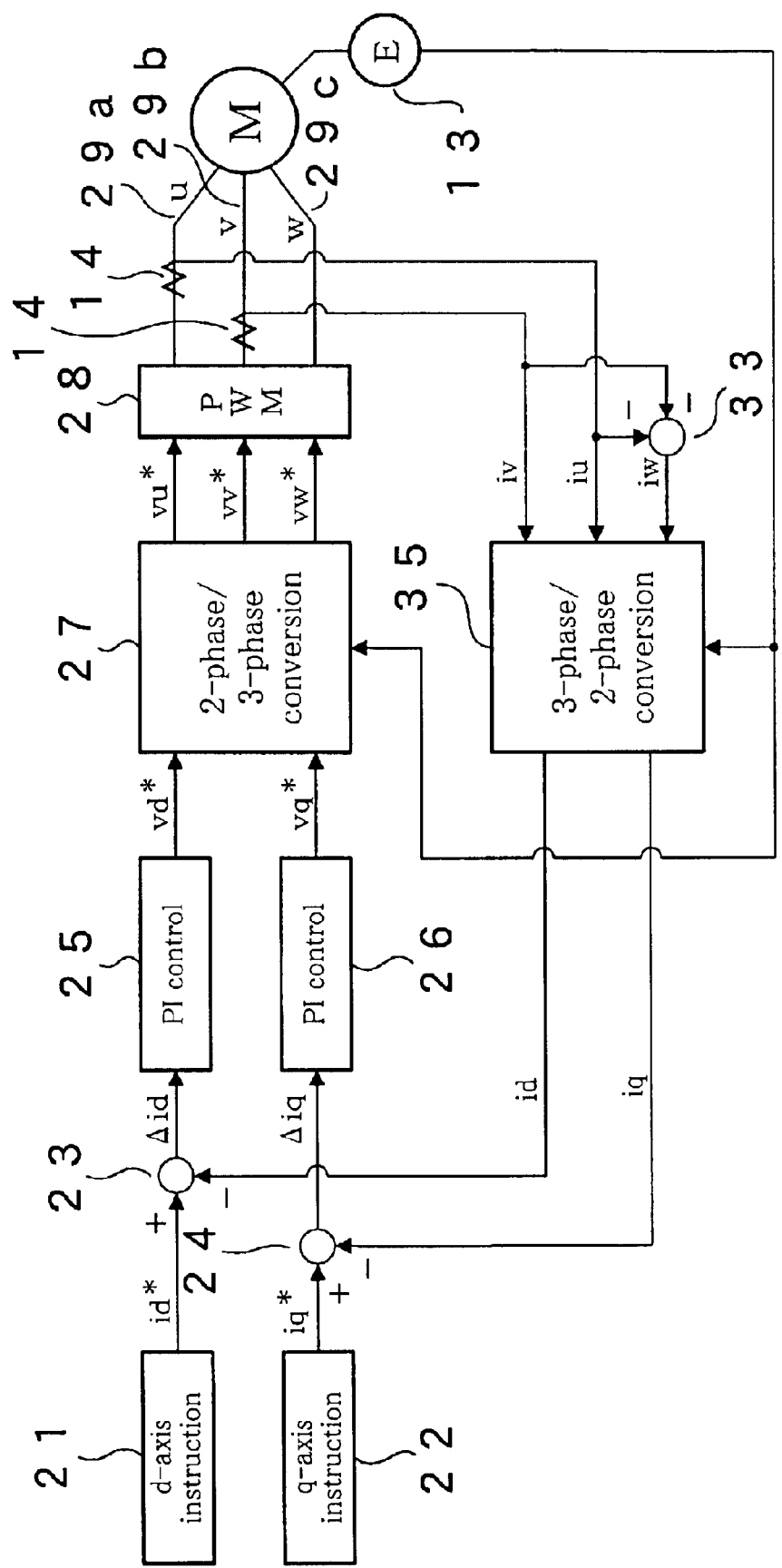
FIG. 3 is a block diagram showing the main functional configuration of the electric power steering mechanism of this embodiment.

As shown in FIG. 3, the function blocks concerning control of the motor M are comprised of mainly, d-axis instruction 21, q-axis instruction 22, computing portions 23, 24, PI control portions 25, 26, a 2-phase/3-phase converting portion 27, a pulse width modulating portion 28, a computing portions 33, a 3-phase/2-phase converting portion 35, a rotation angle sensor 13 and a current sensor 14. The respective functional portions except the pulse width modulating portion 28, the rotation angle sensor 13 and the current sensor 14 are processed by computation with software in the CPU 16 of the aforementioned ECU 15.

First, currents flowing through the phase u and phase v of the motor M are detected by the current sensor 14 and then their current detection values iu, iv are inputted to the 3-phase/2-phase converting portion 35. A current value iw of phase w can be computed by subtracting from the current detection values iu, iv by means of the computing portion 33 and therefore, a result obtained from that computation is inputted to the 3-phase/2-phase converting portion 35 as the current value iw of phase w.

The inputted current values iu, iv, iw are converted to current values id, iq by d/q conversion (2-phase conversion) based on a detection signal detected by the rotation angle sensor 13 for detecting the rotation angle of the rotator of the motor M and then outputted. These converted current values id, iq are inputted to the computing portions 23, 24 as feedback value.

The q-axis instruction 22 and the like are inputted to the computing portions 23, 24 as a torque instruction for the motor M. That is, a torque generated in the rotator of the motor M is computed by the q-axis instruction 22 and its result is inputted to the computing portion 24 as a q-axis current instruction value iq*. Further, exciting current of the rotator of the motor M is computed by the d-axis instruction 21 and its result is inputted to the computing portion 23 as a d-axis current instruction value id*. Because no exciting current needs to be supplied in case of the brushless DC motor whose rotator is a magnet, usually, the d-axis current instruction value id* is set to substantially zero ampere (id*≈0).

The d-axis current instruction value id* and the current value id obtained by conversion with the 3-phase/2-phase converting portion 35 are inputted to the computing portion 23 and a deviation between the both is outputted from the computing portion 23 in the form of Δid and inputted to the PI control portion 25. Likewise, because the q-axis current instruction value iq* and the current value iq obtained by conversion with the 3-phase/2-phase converting portion 35 are inputted to the computing portion 24 and a deviation between the both is outputted from the computing portion 23 in the form of Δiq and inputted to the PI control portion 26.

The PI control portions 25, 26 proportional-integrates the inputted deviations Δid, Δiq each, computes the d-axis voltage instruction value vd*, the q-axis voltage instruction value vq according to a predetermined voltage equation and then outputs to the 2-phase/3-phase converting portion 27.

The 2-phase/3-phase converting portion 27 carries out d/q inverted conversion (3-phase conversion) upon the inputted d-axis voltage instruction value vd* and q-axis voltage instruction value vq* so as to compute the voltage instruction values vu*, vv*, vw*. Then, the pulse width modulating portion (PWM) 28 fetches in the voltage instruction values vu*, vv*, vw* and outputs a pulse signal having a corresponding pulse width to a driving circuit (not shown). The driving circuit applies a drive voltage to the motor M through the power supply lines 29a, 29b, 29c of phases u, v, w.

Because the configuration of such negative feedback loop is capable of controlling the arithmetic operation so that the deviation of each of the current instruction value and the feedback value is zero, torque control or the like on the motor M is enabled.

Figure 4:
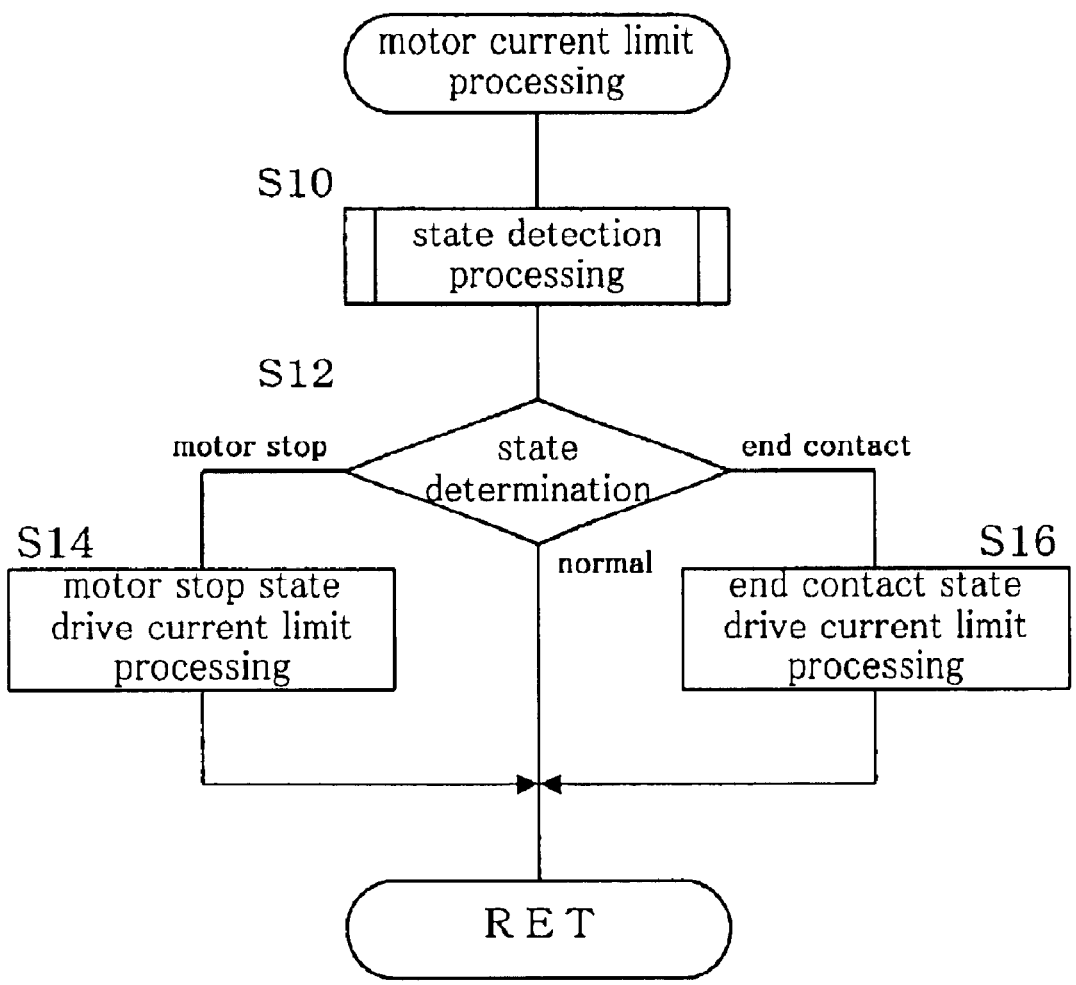
FIG. 4 is a flow chart showing a flow of motor current limit processing by the electric power steering mechanism of this embodiment.

Next, an example in which the control method of the electric power steering mechanism of the present invention is applied to the motor current limit processing in the electric power steering mechanism 10 will be described with reference to FIGS. 1, 4 and 5. Because the motor current limit processing shown in FIG. 4 is provided in the form of a subroutine, this is incorporated in a sequential timer interruption processing which is generated every predetermined time interval. For the reason, a predetermined initialization processing necessary before this motor current limit processing is carried out, for example, the initialization processing such as the motor stop flag, end contact flag, which will be described later, needs to be executed appropriately by a main routine calling the motor current limit processing.

In the motor current limit processing, state detection processing is carried out in step S10. This state detection processing is a processing for detecting which the motor is located in normal state (normal state in FIG. 5), rotation stop state (stop state in FIG. 5) or end contact state (end state in FIG. 5) and FIG. 1 shows a state transition diagram indicating the transition condition for these three states (normal state, stop state, and end state).

First in step S101 of the state detection processing shown in FIG. 5, which the motor stop flag is set to "1" or "0" is determined. Depending on the result of the state detection processing carried out last time, this motor stop flag is set to "1" if it is detected that the rotation of the motor M is stopped and "0" otherwise. In a subsequent description, it is assumed that the motor stop flag is set to "0" because it is just after the initialization processing is executed. If the motor stop flag is set to "0", the processing proceeds to step S111 for next state detection processing.

In step S111, which the end contact flag is set to "1" or "0" is determined. This end contact flag is set to "1" if end contact state is detected depending upon a result of the state detection processing carried out last time and "0" otherwise. In a subsequent description, it is assumed that the end contact flag is set to "0" because it is just after the initialization processing is executed. If the end contact flag is set to "0", the processing proceeds to step S121.

In step S121, whether or not the sensor output (steering torque) of the torque sensor 11 is over 7 Nm is determined. That is, this condition corresponds to "the steering torque is over a predetermined value" and "the steering torque detected by the steering torque detecting means is over a predetermined value".

Depending on this judgment of the condition, if the steering torque is over 7 Nm, it is made evident that a torsion corresponding to this is generated in the torsion bar and therefore, the steering wheel is being turned by a driver. That is, it can be detected that the state which should produce a sensor output from the rotation angle sensor 13 has been reached.

Although according to this embodiment, the threshold of the steering torque is fixed to 7 Nm, the present invention is not restricted to this value. For example, it is permissible to apply a variable value corresponding to the vehicle velocity so that the threshold is set small for high speed traveling while it is set large if the vehicle is traveling at a low speed or stopped. Consequently, setting of the condition is enabled based on the vehicle velocity, so that the state of the rotation angle sensor 13 can be determined more accurately.

If in step S121, the sensor output of the torque sensor 11 is not over 7 Nm (No in S121), it is regarded that no steering by the driver is caused and even if the rotation of the motor M is stopped, it is determined that the condition is normal (normal state). That is, it is determined that the condition is normal irrespective of the output of the rotation angle sensor 13 and then, this state detection processing is terminated. On the other hand, if the sensor output of the torque sensor 11 is over 7 Nm in step S121 (Yes in S121), it is estimated that the steering by the driver is caused and the processing proceeds to processing of step S123.

In step S123, whether or not the sensor output from the rotation angle sensor 13 is less than 1 pulse is determined. This condition corresponds to "the sensor output is substantially zero" and "the sensor output detected by the sensor output detecting means is substantially zero".

The state can be detected depending on this judgment of the condition, that is, whether or not the rotation of the motor M is stopped due to some reason, whether or not the rotation angle sensor is in trouble or whether or not the sensor wire is broken and the like.

If in step S123, the sensor output of the rotation angle sensor 13 is not less than 1 pulse (No in S123), pulse strings of phase A and phase B are outputted with a rotation of the motor M and therefore, it is determined that the condition is normal (normal state) and this state detection processing is terminated. On the other hand, if in step S123, the sensor output from the rotation angle sensor 13 is less than 1 pulse (Yes in S123), it cannot be determined that pulse strings are outputted from the rotation angle sensor 13 properly regardless of it that drive current is applied to the motor M and therefore, the processing proceeds to subsequent step S125.

In step S125, whether or not a period which satisfies both the condition of step S121 and the condition of step S123 are satisfied at the same time continues for more than 200 mS is determined. This condition corresponds to "detects that the both conditions are satisfied at the same time" and "detects a predetermined state".

This judgment of the condition prevents erroneous detection in case where both the conditions of step S121 and step S123 are accidentally satisfied at the same time and enables control timing with other processing to be adjusted.

If in step S125, both the conditions of step S121 and step S123 are not satisfied continuously for more than 200 mS (No in S125), it is determined that the condition is normal (normal state) and this state detection processing is terminated. On the other hand, if in step S125, the two conditions of step S121 and step S123 are satisfied continuously for more than 200 mS (Yes in S125), the motor stop flag is set to "1" while the end contact flag is set to "0" because there is a high possibility that the rotation of the motor M is stopped due to an inappropriate current instruction and this detection processing is terminated.

Return to the motor current limit processing shown in FIG. 4. In step S12, the state of the motor M is determined through the motor stop flag and end contact flag set up by the state detection processing. For example, in the previous example, because the motor stop flag is set to "1" while the end contact flag is set to "0", it is determined that the motor is stopped in step S12 and the processing proceeds to step S14.

Figure 1:
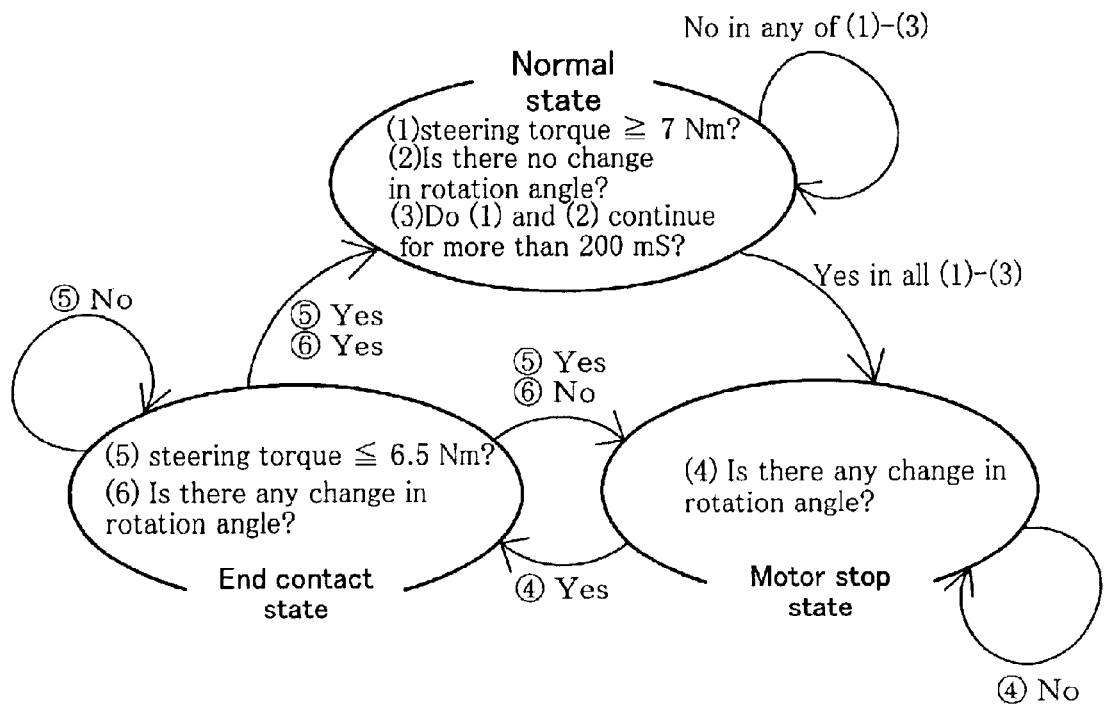
FIG. 1 is a state transition diagram showing each state of state detecting processing by an electric power steering mechanism according to an embodiment of the present invention.

If the motor stop flag is set to "0" while the end contact flag is set to "0", according to the state transition diagram shown in FIG. 1, the state is changed from normal state to normal state (No in any of (1)–(3) of FIG. 1). If the motor stop flag is set to "1" while the end contact flag is set to "0", the state is changed from normal state to motor stop state (Yes in all (1)–(3) of FIG. 1).

In step S14 for motor current limit processing, a processing for limiting the drive current of the motor M in stop state to a predetermined value is carried out. Consequently, an inappropriate current instruction is released. The processing to be executed in this step includes a processing of reducing the drive current gradually by 1 ampere per 5 mS up to 0 ampere, a processing of filtering the current instruction value with a filter having a time constant of 100 mS, a processing of shutting down the drive current (0 ampere) instantaneously and the like. If the drive current is reduced gradually in this way, the rotation stop of the motor M is released slowly and if the drive current is shut down instantaneously, the rotation stop of the motor M is released quickly. Thus, a steering sense depending on the situation can be set up appropriately.

If as described next, the motor stop flag is set to "0" while the end contact flag is set to "1", end contact state is confirmed in step S12 and then, the processing proceeds to step S16. In step S16, a processing for limiting the drive current of the motor M in the end contact state to a predetermined value is carried out.

In step S16, a processing for suppressing the drive current supplied to the motor up to such a current value which generates a torque large enough to block the steering wheel from returning in an opposite direction due to the reaction of a tire is carried out. Consequently, a drive current large enough for making the reaction of the tire and the steering force balance with each other is supplied to the motor M in the end contact state when the steering wheel is steered stationarily and therefore, a larger drive current than necessary is not supplied to the motor M. Therefore, generation of heat in the motor in the end contact state can be prevented.

Next, a case in which the processing proceeds to the state detection processing with the motor stop flag set to "1" and the end stop flag set to "0" will be described with reference to FIG. 5.

As described previously, in step S101, it is judged which the motor stop flag is set to "0" or "1". Thus, because the motor stop flag is set to "1" this time, the processing proceeds to step S103 depending on judgment (Yes) of step S101.

In step S103, a processing for limiting the drive current of the motor M in the motor stop state to a predetermined value is carried out. For example, the drive current is reduced gradually by an ampere per 5 mS up to 0 ampere. Consequently, the rotation stop of the motor M is released slowly and if the end contact state is arisen, the rack shaft is returned in an opposite direction to the rack end due to a reaction of a tire so that the pinion gear on the rack is rotated. That is, if the steering shaft connected to the pinion gear is rotated, the motor M is rotated and accompanied therewith, the rotation angle sensor 13 is rotated so as to generate senor outputs of phases A and B. Therefore, in step S105, it is possible to determine which the end contact state or the motor stop state is generated by determining presence or absence of the sensor output (changes in the rotation angle) of the rotation angle sensor 13.

If in step S105, the sensor output (change in the rotation angle) of the rotation angle sensor 13 occurs (Yes in step S105), the end contact state exists. Therefore, the processing proceeds to step S107, in which the motor stop flag is set to "0" while the end contact flag is set to "1" and then this state detection processing is terminated. On the other hand, if no sensor output (change in the rotation angle) of the rotation angle sensor occurs (No in step S105), the motor remains stopped due to a trouble of the rotation angle sensor. Therefore, the processing proceeds to step S109, in which the motor stop flag is set to "1" while the end contact flag is set to "0". Then, this state detection processing is terminated.

The state in which the motor stop flag is set to "0" while the end contact flag is set to "1" indicates transition from the motor stop state to the end contact state in state transition diagram shown in FIG. 1 (Yes in FIG. 1(4)). The state in which the motor stop flag is set to "1" while the end contact state is set to "0" indicates transition from the motor stop state to the motor stop state (No in FIG. 1(4))

A case where the processing proceeds to state detecting processing with motor stop flag set to "0" and end contact flag set to "1" will be described. As described above, in step S111, which the end contact flag is set to "0" or "1" is determined. Therefore, because the end contact flag is set to "1", the processing of step S113 is adopted by determination (Yes) of step S111.

In step S113, whether or not the steering torque under the end contact state is less than 6.5 Nm is determined. That is, if the end contact state is present, the torsion bar is twisted by some degree of torque by driver's steering the steering wheel. Then, whether or not the end contact state is present is determined by determining the value of sensor output (steering torque) outputted from the torque sensor 11.

If the steering torque detected by the torque sensor 11 is not less than 6.5 Nm in step S113 (No in S113), it comes that a steering torque over 6.5 Nm is produced. In this case, it is estimated that the end contact state is present and this state detection processing is terminated with motor stop flag set to "0" and end contact flag set to "1".

On the other hand, if the steering torque detected by the torque sensor 11 is less than 6.5 Nm (Yes in S113) in step S113, currently the end contact state does not exit and therefore, the processing proceeds to step S115, in which the state detection is progressed.

In step S115, whether or not any sensor output (change in rotation angle) of the rotation angle sensor occurs in a predetermined period (for example, 100 mS) is determined. That is, if the driver releases the steering wheel under the end contact state or similar condition occurs, the steering wheel is returned in an opposite direction. Whether or not any sensor output of the rotation angle sensor 13 is generated under such a condition is determined.

If in step S115, any sensor output (change in rotation angle) of the rotation angle sensor 13 occurs (Yes in step S115), it is determined that the rotation angle sensor 13 is normal (normal state) and the processing proceeds to step S117, in which the motor stop flag is set to "0" while the end contact flag is set to "0". Then, this state detection processing is terminated. On the other hand, if no sensor output (change in rotation angle) of the rotation angle sensor occurs (No in step S115), the motor remains stopped due to a trouble in the rotation angle sensor 13. Thus, the processing proceeds to step S119, in which the motor stop flag is set to "1" while the end contact flag is set to "0" and this state detection processing is terminated.

The state in which the motor stop flag is set to "0" while the end contact flag is set to "1" indicates transition of the state from the end contact state to the end contact state (No in (5) of FIG. 1) in the state transition diagram shown in FIG. 1. The state in which the motor stop flag is set to "0" while the end contact flag is set to "0" indicates transition of the state from the end contact state to the normal state (Yes in (5) and Yes in (6) of FIG. 1). The state in which the motor stop flag is set to "1" while the end contact flag is set to "0" indicates transition of the state from the end contact state to the motor stop state (Yes in (5), No in (6) of FIG. 1).

As described above, if the electric power steering mechanism 10 of this embodiment detects a period in which the condition (1) that the sensor output of the rotation angle sensor 13 is substantially zero and the condition (2) that the steering torque is over 7 Nm are satisfied at the same time (3), the period continuing for more than 200 mS (Yes all in (1)–(3)), the drive power to be supplied to the motor M is restricted to less than a predetermined value. Consequently, torque generated in the motor M is reduced and therefore, if the end contact state occurs, the rack shaft is returned in an opposite direction to the rack end by a reaction of a tire, so that the pinion gear on the rack is rotated. Thus, the steering shaft coupled to the pinion gear is rotated so as to turn the motor M and rotation angle sensor 13. That is, if there occurs a change in the rotation angle because the driving power is decreased (Yes in (4)), the end contact state is generated and if there is no change in the rotation angle (No in (4)), the motor stop state is produced. Therefore, there is such an effect that the end contact state can be detected even if the motor M is not rotated.

Further, the electric power steering mechanism 10 of this embodiment restricts the drive current supplied to the motor M up to a current value, which generates a torque large enough for blocking the steering wheel from returning in an opposite direction due to a reaction of the tire. Thus, the drive power supplied more than necessary can be reduced. Therefore, there is such an effect that generation of heat can be prevented in the end contact state.

The electric power steering mechanism 10 of this embodiment restricts the drive power supplied to the motor M gradually up to 0 ampere in the rate of 1 ampere per 5 mS or shuts down instantaneously, thereby reducing torque generated in the motor M. Consequently, an assist force for assisting the steering force by means of the steering wheel is decreased or vanished. As a result, the steering wheel becomes capable of being steered and steering feeling is improved.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A control method for electric power steering mechanism having a motor for assisting a steering force based on a steering torque generated in a steering shaft, comprising the steps of:

detecting a condition that a sensor output of a rotation angle sensor which detects a rotation angle of said motor and outputs a relative value of said rotation angle is substantially zero;

detecting a condition that said steering torque is over a predetermined value; and upon detection that the detected rotation angle is substantially zero and said steering torque is over a predetermined value are satisfied at the same time, restricting the drive power supplied to said motor to less than a predetermined value.

2. A control method for electric power steering mechanism as claimed in claim 1, including the step of determining, when said drive power is restricted to less than the predetermined value, that if there is a sensor output of said rotation angle sensor, end contact state is present and if there is no sensor output of said rotation angle sensor, motor stop state originated from a trouble in said rotation angle sensor is present.

3. An electric power steering mechanism having a motor for assisting a steering force based on a steering torque generated in a steering shaft, comprising:

a sensor output detecting means for detecting a sensor output of a rotation angle sensor which detects the rotation angle of said motor and outputs a relative value thereof;

a steering torque detecting means for detecting a steering torque generated in said steering shaft;

a state detecting means for detecting such a predetermined state that said sensor output detected by said sensor output detecting means is substantially zero while said steering torque detected by said steering torque detecting means is over a predetermined value; and a drive power restricting means for, if said predetermined state is detected by said state detecting means, restricting the drive power supplied to said motor to less than a predetermined value.

4. An electric power steering mechanism as claimed in claim 3 further comprising a state determining means for, with the drive power restricted to less than the predetermined value by a drive force transmitting means, determining that if there is a sensor output of said rotation angle sensor, end contact state is present and if there is no sensor output of said rotation angle sensor, motor stop state originated from a trouble in said rotation angle sensor is present.

* * * * *